(12) United States Patent
Moman et al.

(10) Patent No.: US 7,084,216 B2
(45) Date of Patent: *Aug. 1, 2006

(54) PROCESS FOR THE POLYMERIZATION OF OLEFINS

(75) Inventors: Akhlaq A. Moman, Riyadh (SA); Khalid Al-Bahily, Riyadh (SA); Atieh Abu-Raqabah, Riyadh (SA); John Ledford, Riyadh (SA); Orass M. Hamed, Riyadh (SA); Raju Raghavan, Riyadh (SA); Sameh Rizkallah, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 10/467,389

(22) PCT Filed: Jan. 30, 2002

(86) PCT No.: PCT/EP02/00932

§ 371 (c)(1),
(2), (4) Date: Jan. 8, 2004

(87) PCT Pub. No.: WO02/064647

PCT Pub. Date: Aug. 22, 2002

(65) Prior Publication Data

US 2005/0101749 A1    May 12, 2005

(30) Foreign Application Priority Data

Feb. 7, 2001   (EP)   ................................. 01102730

(51) Int. Cl.
*C08F 4/642* (2006.01)
*C08F 4/685* (2006.01)
*C08F 4/02* (2006.01)

(52) U.S. Cl. ........................ 526/116; 526/114; 526/904; 526/124.2; 526/124.3; 502/109; 502/113; 502/115; 502/128

(58) Field of Classification Search ................ 526/116, 526/119, 169.2, 904, 124.2, 124.3, 114
See application file for complete search history.

(56) References Cited

U.S. PATENT DOCUMENTS

| | | | |
|---|---|---|---|
| 4,508,842 A | | 4/1985 | Beran et al. |
| 5,118,648 A | | 6/1992 | Furtek et al. |
| 5,298,579 A | * | 3/1994 | Hoff et al. .................. 526/116 |
| 5,534,472 A | | 7/1996 | Winslow et al. |
| 5,661,095 A | | 8/1997 | Meverden et al. |
| 5,670,439 A | | 9/1997 | Winslow et al. |
| 6,413,901 B1 | * | 7/2002 | Moman et al. ............. 502/132 |
| 6,448,348 B1 | * | 9/2002 | Moman et al. .......... 526/124.7 |
| 6,784,263 B1 | * | 8/2004 | Hamed et al. .............. 526/114 |
| 6,861,487 B1 | * | 3/2005 | Hamed et al. .............. 526/160 |

FOREIGN PATENT DOCUMENTS

| | | |
|---|---|---|
| GB | 2 028 347 | 3/1980 |
| WO | 96/30122 | * 10/1996 |
| WO | WO 96/30122 | 10/1996 |
| WO | WO 00/23480 | 4/2000 |

* cited by examiner

*Primary Examiner*—Roberto Rabago
(74) *Attorney, Agent, or Firm*—Kramer Levin Naftalis & Frankel LLP

(57) ABSTRACT

The present invention relates to a process for homopolymerization of ethylene or copolymerization of ethylene with alpha-olefins by contacting ethylene or ethylene and alpha-olefin with a catalyst composition comprising: (a) a solid catalyst precursor comprising at least one vanadium compound, at least one magnesium compound and a polymeric material or a solid catalyst precursor comprising at least one vanadium compound, at least one further transition metal compound and/or at least one alcohol, at least one magnesium compound and a polymeric material; and (b) a cocatalyst comprising an aluminum compound.

19 Claims, 1 Drawing Sheet

FIGURE
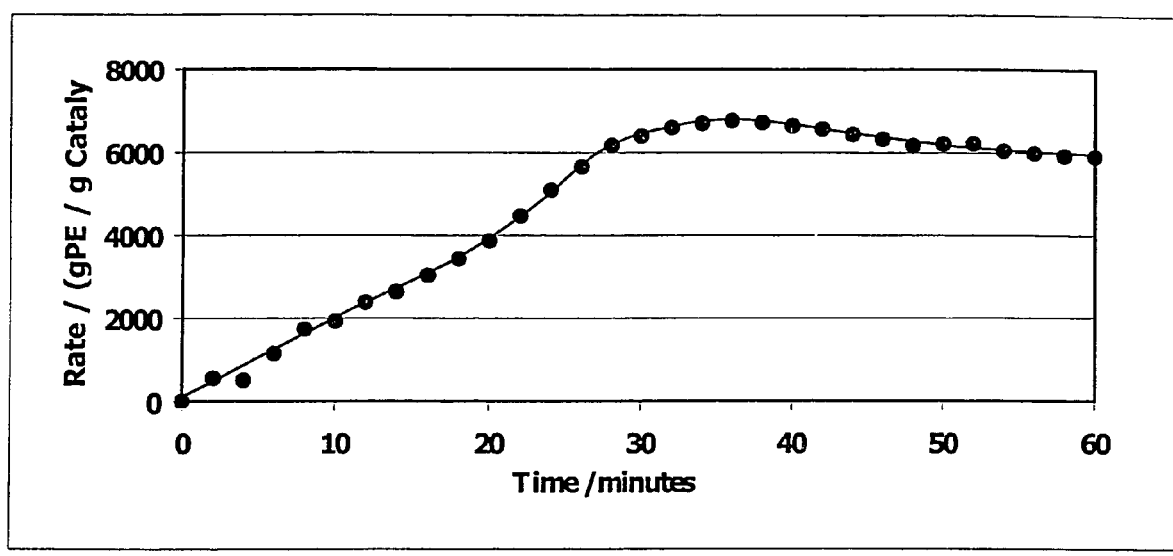

PROCESS FOR THE POLYMERIZATION OF OLEFINS

FIELD OF THE INVENTION

The present invention relates to a process for the polymerization of olefins.

DESCRIPTION OF THE PRIOR ART

Several publications are referenced in this application. These references describe the state of the art to which this invention pertains, and are incorporated herein by reference.

The application of vanadium based Ziegler-Natta catalysts for industrial use has been limited to vanadium trichloride and vanadium oxytrichloride as homogenous catalysts in solution polymerization for the production of ethylene-propylene copolymers. To attain suitable activity for polymerization these catalysts require the use of halogenated organic molecules such as chloroform and trichlorofluoromethane as a promoter. In the absence of the promoter the catalyst activity is low. Further, the kinetic behavior of these catalysts during polymerization display high initial rates of polymerization followed by a sharp decrease with time, decay type rate-time kinetics, and as a result produce resin of poor morphology.

The application of vanadium based catalysts for ethylene polymerization, high density and linear low density polyethylene production, has been comparatively very limited. Attempts have been made to support vanadium based catalysts on silica or magnesium chloride to produce catalysts for ethylene polymerization. U.S. Pat. No. 4,508,842 describes a catalyst preparation in which a complex of $VCl_3$ and tetrahydrofuran (THF) is treated with silica, the solvent is then removed from the solid by distillation and a boron trihalide or alkylaluminum halide modifier is added to the solid. In addition, chloroform is used as a promoter with the catalyst for ethylene polymerization. However the productivity and stability of this catalyst system is relatively poor.

U.S. Pat. Nos. 5,534,472 and 5,670,439 describe a silica supported vanadium catalyst prepared by the prior contacting of silica with an organomagnesium compound and a trialkylaluminum compound. The catalysts are suitable for the production of ethylene-hexene copolymer. However, the polymerizations are conducted with trichlorofluoromethane or dibromomethane promoters.

Further, procedures typically used for the preparation of suitable magnesium chloride and silica supports such as spray drying or re-crystallization processes are complicated and expensive. Also, the inorganic supports remain in the product, which can affect the product properties, such as optical properties, or processing.

It is an object of the present invention to provide a process for polymerization of olefins which overcomes the drawbacks of the prior art, especially providing a process which is cheap in carrying out and which produces a polymer with improved productivity and activity without using halogenated organic molecules as a promoter.

SUMMARY OF THE INVENTION

The present invention provides a process for homopolymerization of ethylene or copolymerization of ethylene with alpha-olefins by contacting ethylene or ethylene and alpha-olefin with a catalyst composition comprising: (a) a solid catalyst precursor comprising at least one vanadium compound, at least one magnesium compound and a polymeric material; and (b) a cocatalyst comprising at least one aluminum compound.

Most preferably, the component (a) used in the catalyst composition for the process of the present invention further comprises at least one further transition metal compound and/or at least one alcohol.

As a result of the present invention polyolefin and especially polyethylenes and copolymers of ethylene and alpha-olefins are provided which have a density of about 0.88 to 0.98 $g/cm^3$ and weight average molecular weight of about 500 to 900 000 g/mole and molecular weight distribution range of about 2 to about 30. The products have a uniform spherical particle morphology, very low level of fines and catalyst residues, improved thermal stability, excellent optical and improved environmental stress cracking resistance (ESCR).

DETAILED DESCRIPTION OF THE INVENTION

Further advantages and features of the present invention will become apparent by the following detailed description in connection with the accompanying drawing.

In the drawing the Figure is a polymerization kinetic rate-time profile for ethylene polymerization using the catalyst composition of the present invention described in Example 1 below and a process of the present invention described in Example 5 below.

The profile shows a rate build up followed by a stable rate-time profile resulting in product polymer of spherical morphology and uniform particle size distribution.

The ethylene homopolymers and copolymers which may be prepared by the process of the present invention can have a wide density range of about 0.88 to 0.98 $g/cm^3$. The process of the present invention provides polyolefins, and preferably high density polyethylene and linear low density polyethylene. The density of the polymer at a given melt index can be regulated by the amount of the alpha-olefin comonomer used. The amount of alpha-olefin comonomer needed to achieve the same density is varied according to the type of comonomer used. These alpha-olefins have 4 to 10 carbon atoms and include 1-butene, 1-pentene, 4-methyl-1-pentene, 1-hexene, 1-heptene, 1-octene and/or mixtures thereof.

The weight average molecular weight (Mw) of the polymers produced by the process of the present invention is in the range of about 500 to 900 000 g/mole or higher, preferably from about 10 000 to 750 000 g/mole; depending on the amount of hydrogen used, the polymerization temperature and the polymer density attained. The homopolymers and copolymers of the present invention have a melt index (MI) range of more than 0 and up to 100, preferably between 0.3 to 50. The polymers of such wide range of MI are capable of being used in film and molding applications.

The molecular weight distribution (MWD) of the polymers produced by the process of the present invention expressed as weight average molecular weight/number average molecular weight (Mw/Mn), is in the range of about 2 to about 30.

The polymers produced by the process of the present invention are granular materials, uniform and spherical particles with an average particle size of about 0.1 to 4 mm in diameter and contain a very low level of fines.

The solid catalyst precursor used in the present invention comprises a polymeric material in the form of particles having a mean particle diameter of about 5 to 1 000 microns and a pore volume of at least about 0.05 cm$^3$/g and a pore diameter of about 20 to 10 000 angstroms, preferably from about 500 to 10 000 angstroms, and a surface area of about 0.1 to 100 m$^2$/g, preferably from about 0.2 to 30 m$^2$/g.

The vanadium compound used for the catalyst composition for the process of the present invention is represented by the general formulas V(OR$^1$)$_n$X$_{4-n}$, V(R$^2$)$_n$X$_{4-n}$, VX$_3$ and VOX$_3$, wherein R$^1$ and R$^2$ represent an alkyl group, aryl group or cycloalkyl group having 1 to 20 carbon atoms, X represents a halogen and n represents a number satisfying $0 \leq n \leq 4$. Examples of R$^1$ and R$^2$ include alkyl groups such as methyl, ethyl, n-propyl, isopropyl, n-butyl, isobutyl, tert-butyl and the like.

Preferred examples of the above mentioned vanadium compounds are selected from the group comprising vanadium tetraethoxide, vanadium tetrapropoxide, vanadium tetrabutoxide, vanadium trichloride, vanadium tetrachloride, vanadium oxytrichloride, vanadium dichlorodiethoxide and/or the like. Vanadium tetrachloride and/or vanadium oxytrichloride are most preferred.

The transition metal compound which may be used for the catalyst composition for the process of the present invention is represented by the general formulas Tm(OR$^3$)$_n$X$_{4-n}$, TmOX$_3$ and Tm(R$^4$)$_n$X$_{4-n}$, wherein Tm represents a transition metal of Group IVB, VB, or VIB, wherein R$^3$ and R$^4$ represent an alkyl group, aryl group or cycloalkyl group having 1 to 20 carbon atoms, X represents a halogen atom and n represents a number satisfying $0 \leq n \leq 4$. Non-limiting examples of the transition metal are titanium and vanadium, examples of R$^3$ and R$^4$ include alkyl groups such as methyl, ethyl, n-propyl, isopropyl, n-butyl, isobutyl, tert-butyl and the like.

Preferred examples of the above mentioned transition metal compounds are selected from the group comprising titanium trichloromethoxide, titanium dichlorodimethoxide, titanium tetramethoxide, titanium trichloroethoxide, titanium dichlorodiethoxide, titanium tetraethoxide, titanium trichloropropoxide, titanium dichlorodipropoxide, titanium chlorotripropoxide, titanium tetrapropoxide, titanium trichlorobutoxide, titanium dichlorodibutoxide, titanium tetrabutoxide, vanadium tetrachloride, vanadium tetraethoxide, vanadium tetrapropoxide, vanadium tetrabutoxide, vanadium oxytrichloride, vanadium dichlorodiethoxide and/or the like. Titanium tetraethoxide, titanium tetrapropoxide and/or titanium tetrabutoxide are most preferred.

The alcohol compound which may be used for the catalyst composition for the process of the present invention includes compounds represented by the general formula R$^5$OH, wherein R$^5$ is an alkyl group, aryl group or cycloalkyl group having 1 to 20 carbon atoms. Examples of R$^5$ include groups such as methyl, ethyl, n-propyl, isopropyl, n-butyl, isobutyl, tert-butyl, cyclohexyl, phenyl, methylphenyl, ethylphenyl and the like.

Preferred examples of the above mentioned alcohols are selected from the group comprising methanol, ethanol, n-propanol, isopropanol, n-butanol, isobutanol, tert-butanol, cyclohexanol, phenol, methylphenol, ethylphenol and/or mixtures thereof.

The magnesium compound used for the catalyst composition for the process of the present invention include Grignard compounds represented by the general formula R$^6$MgX, wherein R$^6$ is a hydrocarbon group having 1 to 20 carbon atoms and X is a halogen atom, preferably chlorine. Other preferred magnesium compounds are represented by the general formula R$^7$R$^8$Mg, wherein R$^7$ and R$^8$ are each a hydrocarbon group having 1 to 20 carbon atoms.

Preferred examples of the above mentioned magnesium compounds include dialkylmagnesium such as diethylmagnesium, di-n-propylmagnesium, di-isopropylmagnesium, di-n-butylmagnesium, di-isobutylmagnesium butylethylmagnesium, dihexylmagnesium, dioctylmagnesium, butyloctylmagnesium; alkylmagnesium chloride such as ethylmagnesium chloride, butylmagnesium chloride, hexylmagnesium chloride and/or mixtures thereof.

The polymer particles used for the catalyst composition for the process of the present invention have a spherical shape with a mean particle diameter of about 5 to 1 000 microns and a pore volume of at least about 0.05 cm$^3$/g and a pore diameter of about 20 to 10 000 angstroms, preferably from about 500 to 10 000 angstroms, and a surface area of about 0.1 to 100 m$^2$/g, preferably from about 0.2 to 30 m$^2$/g.

Examples of the above polymeric supports used for the catalyst composition for the process of the present invention are selected from the group comprising polymer particles of polyvinylchloride, polyvinylalcohol, polyketone, hydrolyzed polyketone, ethylene-vinylalcohol copolymer, polycarbonate and the like. Among these polymeric materials polyvinylchloride is more preferred and non-crosslinked polyvinylchloride particles are most preferred. Polyvinylchloride having a molecular weight in the range of about 5 000 to 500 000 g/mole is most preferred.

The use of the polymer particles mentioned in the present invention, in catalyst preparation offers significant advantages over traditional olefin polymerization catalysts using supports such as silica or magnesium chloride. In comparison to the silica supported catalyst, the polymer particles described in catalyst preparation of the present invention do not require high temperature and prolonged dehydration steps prior to their use in catalyst synthesis, thereby simplifying the synthesis process and thus reducing the overall cost of catalyst preparation. Further, the cost of the polymeric support used in the present invention is substantially cheaper than silica or magnesium chloride supports. In addition, the catalyst of the present invention uses significantly lower levels of catalyst components for catalyst preparation than silica or magnesium chloride supported catalysts. Also, the process of the present invention exhibits a higher activity than processes with conventional silica or magnesium chloride supported catalysts.

According to one embodiment of the present invention, a polyvinylchloride support is used in the process. The synthesis of the solid catalyst precursor of the present invention involves introducing the polymeric material described above into a vessel and then adding a diluent. Suitable diluents include isopentane, hexane, cyclohexane, heptane, isooctane and pentamethylheptane. The polymeric material is then treated with a magnesium compound described above at a temperature in the range of about 10° C. to 130° C. The ratio of magnesium compound to the polymer support may be in the range of about 0.05 to 20 mmol per gram of polymer, preferably 0.1 to 10 mmol per gram polymer. The solvent is then vaporized using a nitrogen purge at a temperature in the range of about 20° C. to 100° C.

The resulting free-flowing solid product is then slurried. Suitable solvents for slurring include isopentane, hexane, cyclohexane, heptane, isooctane and pentamethylheptane. The magnesium modified polymeric material is then treated with a transition metal compound and/or an alcohol described above at a temperature in the range of about 10° C. to 130° C. According to the present invention titanium tetramethoxide, titanium tetraethoxide, titanium tetrapropoxide, titanium tetrabutoxide are preferred transition metal compounds and methanol, ethanol, n-propanol, isopropanol, n-butanol are preferred alcohols. The resulting material is then treated with a vanadium compound described above at a temperature in the range of about 10° C. to 130° C. According to the present invention vanadium tetrachloride and/or vanadium oxytrichloride are preferred vanadium compounds.

The produced solid catalyst precursor is then washed several times with a suitable solvent such as isopentane, hexane, cyclohexane, heptane, or isooctane. The solid catalyst precursor is then dried using a nitrogen purge at a temperature in the range of 20° C. to 100° C. In the final dried solid catalyst precursor, the molar ratio of vanadium to magnesium is in the range of about 0.01 to 50. In the case where the transition metal compound is used in catalyst preparation the molar ratio of vanadium to transition metal in the catalyst precursor is in the range of about 0.01 to 50, and in the case where alcohol is used in catalyst preparation the molar ratio of vanadium to OH groups in the catalyst precursor is in the range of about 0.01 to 50.

The catalyst compositions used for the process of the present invention are not subjected to halogenation treatments, for example chlorination treatments. The thus-formed catalyst precursor of the present invention is suitably activated by aluminum compounds, also known as cocatalysts. The activation process can be a one step in which the catalyst is fully activated in the reactor, or two steps, in which the catalyst is partially activated outside the reactor and the complete activation occurs inside the reactor. Unlike catalyst compositions described in the prior art the catalyst compositions of the present invention do not require promoters such as chloroform, trichlorofluoromethane or dibromomethane during polymerization.

The aluminum compounds, also known as cocatalyst, used in the process of the present invention are represented by the general formula $R^9_n AlX_{3-n}$, wherein $R^9$ represents a hydrocarbon group having 1 to 10 carbon atoms, X represents a halogen and represents a number satisfying $0 \leq n \leq 3$. Illustrative but not limiting examples include trialkylaluminums such as trimethylaluminum, triethylaluminum, tri-isobutylaluminum or tri-n-hexylaluminum; dialkylaluminum chloride such as dimethylaluminum chloride, diethylaluminum chloride. The preferred activators of the above general formula are trimethylaluminum, triethylaluminum, tri-isobutylaluminum and tri-n-hexylaluminum.

Examples of other suialuminum compounds of the present invention are represented by the general formula $R^{10}R^{11}Al-O-AlR^{12}R^{13}$, wherein $R^{10}$, $R^{11}$, $R^{12}$ and $R^{13}$ are either the same or different linear, branched or cyclic alkyl group having 1 to 12 carbon atoms, such as methyl, ethyl, propyl or isobutyl. The preferred examples are methylaluminoxane (MAO) and modified methylaluminoxane (MMAO). Further, mixtures of alkylaluminum compounds and aluminoxane compounds described above can also be conveniently used in the present invention.

The cocatalyst in the present invention can be added to the catalyst precursor before and/or during the polymerization reaction. The cocatalyst in the present invention can be used in an amount of about 10 to 5 000 in terms moles of aluminum in the cocatalyst to moles of transition metal in the catalyst precursor, and is preferably in the range of 20 to 3 000.

The process of the present invention can be carried out in slurry, solution and gas phase conditions. Gas phase polymerization can be carried out in stirred bed reactors and in fluidized bed reactors. Suitable ethylene pressures are in the range of about 3 to 40 bar, more preferably 5 to 30 bar and suitable polymerization temperatures are in the range of about 30° C. to 110° C., preferably 50° C. to 95° C. In addition to polyethylene homopolymer, ethylene copolymers with alpha-olefins having 4 to 10 carbon atoms are readily prepared by the present invention. Particular examples include ethylene/1-butene, ethylene/1-pentene, ethylene/1-heptene, ethylene/1-hexene, ethylene/1-octene and ethylene/4-methyl 1-pentene. The density of the polymer at a given melt index can be regulated by the amount and nature of the alpha-olefin comonomer used. Hydrogen can be very conveniently used during polymerization using the catalyst described in the present invention to regulate the molecular weight of the polymer product.

Catalysts described in the prior art display undesirable decay type polymerization rate-time profiles, however the catalysts described in the present invention display build up followed by stable polymerization rate-time profiles, as seen in the Figure, such profiles are very suitable in gas, slurry and solution phase polymerization processes and provide polymer of good morphology and high resin bulk density.

EXAMPLES

The following examples are intended to be illustrative of this invention. They are, of course, not be taken in any way limiting on the scope of this invention. Numerous changes and modifications can be made with respect to the invention.

Test Methods

The properties of the polymers produced in the following examples were determined by the following test methods:

Mw, Mn, and MWD were measured at 135° C. by Gel Permeation Chromatography (GPC) using mixed mode columns and trichlorobenzene as solvent. Melting point (Mp) was determined by Differential Scanning Calorimetry (DSC).

Example 1

Synthesis of Solid Catalyst Precursor (A)

To a three-necked round bottom flask, equipped with a condenser and a magnetic stirrer, was placed 10.0 g of polyvinylchloride spheres with an average particle size of 36 microns. The flask containing the polyvinylchloride was heated up to 70° C. using an oil bath and then evacuated at 30 mm Hg pressure for 30 minutes. The flask and its contents were then purged with dried nitrogen and the polyvinylchloride was slurried using 30 cm³ of isopentane. Then 1.5 cm³ of butylmagnesium chloride (2.0 molar in diethylether) was added to the slurry and the resultant mixture was stirred for 60 minutes at an oil bath temperature of 35° C., under reflux conditions. The isopentane was then evaporated to obtain a free-flowing powder by using a nitrogen purge at 35° C.

Then the magnesium-modified polyvinylchloride was slurried using 30 cm³ of isopentane and 2.0 cm³ of titanium tetraethoxide (1.0 molar in n-hexane) was added to the slurry and the resulting mixture was stirred at 35° C. for 40 minutes. A dark green/brown colored solid was produced. Then 8.0 cm³ of vanadium tetrachloride (1.0 molar in n-hexane) was added to contents of the flask and the resulting mixture was stirred at 35° C. for 20 minutes. The supernatant liquid was decanted and the resulting solid product was washed by stirring with 80 cm³ of isopentane and then removing the isopentane, then washed again twice with 80 cm³ of isopentane in each wash. Finally, the solid catalyst was dried using a nitrogen purge at 35° C. to yield a free-flowing brown colored solid product. The solid catalyst precursor was analyzed by atomic adsorption spectroscopy and was found to contain 0.57% by weight magnesium, 0.54% by weight titanium and 1.77% by weight vanadium.

Example 2

Ethylene Polymerization

An autoclave with a volume of 3 liters was purged with nitrogen at 130° C. for 30 minutes. After cooling the autoclave to 85° C. the reactor was purged with hydrogen and then 1.5 liters of n-hexane were introduced to the reactor. The reactor was then pressurized to 3 barg hydrogen pressure. Then 5.0 cm$^3$ of tri-isobutylaluminum, TIBAL (1.0 molar in n-hexane) was injected into the reactor. Ethylene was introduced to the reactor such as to raise the reactor pressure to 15 barg. This was followed by injection of 0.1 g of the solid catalyst precursor "A" described in Example 1 after being slurried in 20 cm$^3$ of n-hexane solvent. Polymerization was carried out for 1 hour; with ethylene supplied on demand to maintain the total reactor pressure at 15 barg. 390 grams of polyethylene were recovered with a catalyst productivity of 3900 gPE/g catalyst, a resin bulk density of 0.290 g/cm$^3$, a weight average molecular weight of 94 050 g/mole, a number average molecular weight of 28 350, a molecular weight distribution of 3.32 and a melting point of 135° C.

Examples 3,4

Ethylene Polymerization

An autoclave with a volume of 3 liters was purged with nitrogen at 130° C. for 30 minutes. After cooling the autoclave to 85° C. the reactor was purged with hydrogen and then 1.5 liters of n-hexane were introduced to the reactor. The reactor was then pressurised to 3 barg hydrogen pressure. Then, the desired quantity of triethylaluminum, TEAL (1.0 molar in n-hexane), described in Table 1 below, was injected into the reactor. Ethylene was introduced to the reactor such as to raise the reactor pressure to 15 barg. This was followed by injection of 0.1 g of the solid catalyst precursor "A" described in Example 1 after being slurried in 20 cm$^3$ of n-hexane solvent. Polymerization was carried out for 1 hour; with ethylene supplied on demand to maintain the total reactor pressure at 15 barg. Catalyst performance and product polymer properties are described in Table 1.

Examples 5,6

Ethylene Polymerization

An autoclave with a volume of 3 liters was purged with nitrogen at 130° C. for 30 minutes. After cooling the autoclave to 85° C. the reactor was purged with hydrogen and then 1.5 liters of n-hexane were introduced to the reactor. The reactor was then pressurised to the desired hydrogen pressure, described in Table 2 below. Then 4.0 cm$^3$ of triethylaluminum, TEAL (1.0 molar in n-hexane) was injected into the reactor. Ethylene was introduced to the reactor such as to raise the reactor pressure to 15 barg. This was followed by injection of 0.1 g of the solid catalyst precursor "A" described in Example 1 after being slurried in 20 cm$^3$ of n-hexane solvent. Polymerization was carried out for 1 hour; with ethylene supplied on demand to maintain the total reactor pressure at 15 barg. Catalyst performance and product polymer properties are described in Table 2.

TABLE 2

Influence of Hydrogen Pressure

| Example | Hydrogen Pressure/ (barg) | Yield/ (g PE) | Productivity/ (g PE/g catalyst) | Bulk Density/ (g/cm$^3$) | Mw/ (1000 g/mol) | Mn/ (1000) | MWD | DSC/ (Mp/° C.) |
|---|---|---|---|---|---|---|---|---|
| 5 | 2 | 490 | 4900 | 0.290 | 151 | 43.3 | 3.48 | 139 |
| 3 | 3 | 500 | 5000 | 0.310 | 135 | 36.4 | 3.71 | 13 |
| 6 | 4 | 305 | 3050 | 0.260 | 114 | 33.7 | 3.37 | 137 |

Example 7

Ethylene-Butene Copolymerization

An autoclave with a volume of 3 liters was purged with nitrogen at 130° C. for 30 minutes. After cooling the autoclave to 85° C. the reactor was purged with hydrogen and then 1.5 liters of n-hexane were introduced to the reactor. Then the desired quantity of butene, described in Table 3 below, was added to the reactor. The reactor was then pressurized to 3 barg hydrogen pressure. Then 4.0 cm$^3$ of triethylaluminum, TEAL (1.0 molar in n-hexane) was injected into the reactor. Ethylene was introduced to the reactor such as to raise the reactor pressure to 15 barg. This was followed by injection of 0.1 g of the solid catalyst precursor "A" described in Example 1 after being slurried in 20 cm$^3$ of n-hexane solvent. Polymerization was carried out for 1 hour; with ethylene supplied on demand to maintain the total reactor pressure at 15 barg. Catalyst performance and product polymer properties are described in Table 3.

TABLE 1

Influence of TEAL Concentration

| Example | TEAL/ (mmol) | Yield/ (g PE) | Productivity/ (g PE/g catalyst) | Bulk Density/ (g/cm$^3$) | Mw/ (1000 g/mol) | Mn/ (1000) | MWD | DSC/ (Mp/° C.) |
|---|---|---|---|---|---|---|---|---|
| 3 | 4 | 500 | 5000 | 0.310 | 135 | 36.4 | 3.71 | 138 |
| 4 | 6 | 455 | 4550 | 0.303 | 109 | 35.2 | 3.10 | 137 |

TABLE 3

Influence of Butene

| Example | Butene/ (cm³) | Yield/ (g PE) | Productivity/ (g PE/g catalyst) | Bulk Density/ (g/cm³) | Mw/ (1000 g/mol) | Mn/ (1000) | MWD | DSC/ (Mp/° C.) |
|---|---|---|---|---|---|---|---|---|
| 3 | 0 | 500 | 5000 | 0.310 | 135 | 36.4 | 3.71 | 138 |
| 7 | 10 | 502 | 5020 | 0.300 | 135 | 35.7 | 3.77 | 138 |

Example 8

Ethylene-Hexene Copolymerization

An autoclave with a volume of 3 liters was purged with nitrogen at 130° C. for 30 minutes. After cooling the autoclave to 85° C. the reactor was purged with hydrogen and then 1.5 liters of n-hexane were introduced to the reactor. Then the desired quantity of hexene, described in Table 4 below, was added to the reactor. The reactor was then pressurized to 3 barg hydrogen pressure. Then 4.0 cm³ of triethylaluminum, TEAL (1.0 molar in n-hexane) was injected into the reactor. Ethylene was introduced to the reactor such as to raise the: reactor pressure to 15 barg.

This was followed by injection of 0.1 g of the solid catalyst precursor "A" described in Example 1 after being slurried in 20 cm³ of n-hexane solvent. Polymerization was carried out for 1 hour; with ethylene supplied on demand to maintain the total reactor pressure at 15 barg. Catalyst performance and product polymer properties are described in Table 4.

TABLE 4

Influence of Hexene

| Example | Hexene/ (cm³) | Yield/ (g PE) | Productivity/ (g PE/g catalyst) | Bulk Density/ (g/cm³) | Mw/ (1000 g/mol) | Mn/ (1000) | MWD | DSC/ (Mp/° C.) |
|---|---|---|---|---|---|---|---|---|
| 3 | 0 | 500 | 5000 | 0.310 | 135 | 36.4 | 3.71 | 138 |
| 8 | 10 | 476 | 4760 | 0.302 | 134 | 41.8 | 3.21 | 137 |

Example 9

Synthesis of Solid Catalyst Precursor (B)

To a three-necked round bottom flask, equipped with a condenser and a magnetic stirrer, was placed 10.0 g of polyvinylchloride spheres with an average particle size of 36 microns. The flask containing the polyvinylchloride was heated up to 70° C. using an oil bath and then evacuated at 30 mm Hg pressure for 30 minutes. The flask and its contents were then purged with dried nitrogen and the polyvinylchloride was slurried using 30 cm³ of isopentane. Then 1.5 cm³ of butylmagnesium chloride (2.0 molar in diethylether) was added to the slurry and the resultant mixture was stirred for 60 minutes at an oil bath temperature of 35° C., under reflux conditions. The isopentane was then evaporated to obtain a free-flowing powder by using a nitrogen purge at 35° C.

Then the magnesium-modified polyvinylchloride was slurried using 30 cm³ of isopentane and 2.0 cm³ of titanium tetraethoxide (1.0 molar in n-hexane) was added to the slurry and the resulting mixture was stirred at 35° C. for 40 minutes. A dark green/brown colored solid was produced. Then 8.0 cm³ of vanadium oxytrichloride (1.0 molar in n-hexane) was added to contents of the flask and the resulting mixture was stirred at 35° C. for 20 minutes. The supernatant liquid was decanted and the resulting solid product was washed by stirring with 80 cm³ of isopentane and then removing the isopentane, then washed again twice with 80 cm³ of isopentane in each wash. Finally, the solid catalyst was dried using a nitrogen purge at 35° C. to yield a free-flowing brown colored solid product. The solid catalyst precursor was analyzed by atomic adsorption spectroscopy and was found to contain 0.74% by weight magnesium, 0.56% by weight titanium and 1.50% by weight vanadium.

Example 10

Ethylene Polymerization

An autoclave with a volume of 3 liters was purged with nitrogen at 130° C. for 30 minutes. After cooling the autoclave to 85° C. the reactor was purged with hydrogen and then 1.5 liters of n-hexane were introduced to the reactor. The reactor was then pressurised to 3 barg hydrogen pressure. Then, 4.0 cm³ of triethylaluminum, TEAL (1.0 molar in n-hexane) was injected into the reactor. Ethylene was introduced to the reactor such as to raise the reactor pressure to 15 barg. This was followed by injection of 0.1 g of the solid catalyst precursor "B" described in Example 9 after being slurried in 20 cm³ of n-hexane solvent. Polymerization was carried out for 1 hour; with ethylene supplied on demand to maintain the total reactor pressure at 15 barg. 200 grams of polyethylene were recovered with a catalyst productivity of 2000 gPE/g catalyst, a resin bulk density of 0.260 g/cm³, a weight average molecular weight of 157 000 g/mole, a number average molecular weight of 44 950, a molecular weight distribution of 3.49 and a melting point of 138° C.

The features disclosed in the foregoing description, in the claims and/or in the drawing may, both separately and in any combination thereof, be material for realising the invention in diverse forms thereof.

The invention claimed is:
1. A process for homopolymerization of ethylene or copolymerization of ethylene with alpha-olefins comprising contacting ethylene or ethylene and alpha-olefin with a catalyst composition comprising:
(i) a solid catalyst precursor consisting essentially of at least one vanadium compound represented by the general formulas $V(OR^1)_nX_{4-n}$, $V(R^2)_nX_{4-n}$, $VX_3$ and $VOX_3$ wherein $R^1$ and $R^2$ represent an alkyl group, aryl group or cycloalkyl group having 1 to 20 carbon atoms, and X represents a halogen and n represents a number satisfying $0 \leq n \leq 4$, a titanium compound represented by the general formulas $Ti(OR^3)_nX_{4-n}$, $TiOX_3$ and $Ti(R^4)_nX_{4-n}$, $R^3$ and $R^4$ represent an alkyl group, aryl group or cycloalkyl group having 1 to 20 carbon atoms, X represents a halogen atom and n represents a number satisfying $0 \leq n \leq 4$ at least one Grignard compound represented by the general formula $R^6MgX$ wherein $R^6$ is a hydrocarbon group having 1 to 20 carbon atoms and X is a halogen atom or a dialkyl magnesium compound represented by the general formula $R^7R^8Mg$, wherein $R^7$ and $R^8$ are each a hydrocarbon group having 1 to 20 carbon atoms, and a polyvinylchloride polymeric support; and
(ii) a cocatalyst comprising an aluminum compound represented by the general formula $R^9_nAlX_{3-n}$ wherein $R^9$ represents a hydrocarbon group having 1 to 10 carbon atoms; X represents a halogen and n represents a number satisfying $0 \leq n \leq 3$, or by the general formula $R^{10}R^{11}Al-O-AlR^{12}R^{13}$, wherein $R^{10}$, $R^{11}$, $R^{12}$ and $R^{13}$ are either the same or different linear, branched or cyclic alkyl group having 1 to 12 carbons, or is an aluminoxane.

2. The process according to claim 1, wherein said vanadium compound is selected from the group consisting of vanadium tetraethoxide, vanadium tetrapropoxide, vanadium tetrabutoxide, vanadium trichloride, vanadium tetrachloride, vanadium oxytrichloride, and vanadium dichlorodiethoxide.

3. The process according to claim 2, wherein said vanadium compound is vanadium tetrachloride or vanadium oxytrichloride.

4. The process according to claim 1, wherein the titanium compound is selected from the group consisting of titanium trichloromethoxide, titanium dichlorodimethoxide, titanium tetramethoxide, titanium trichloroethoxide, titanium dichlorodiethoxide, titanium tetraethoxide, titanium trichloropropoxide, titanium dichlorodipropoxide, titanium chlorotripropoxide, titanium tetrapropoxide, titanium trichlorobutoxide, titanium dichlorodibutoxide, and titanium tetrabutoxide.

5. The process according to claim 4, wherein the titanium compound is titanium tetraethoxide, titanium tetrapropoxide or titanium tetrabutoxide.

6. The process according to claim 2, wherein the magnesium compound is selected from the group consisting of diethylmagnesium, di-n-propylmagnesium, di-isopropylmagnesium, di-n-butylmagnesium, di-isobutylmagnesium butylethylmagnesium, dihexylmagnesium, dioctylmagnesium, butyloctylmagnesium, ethylmagnesium chloride, butylmagnesium chloride, or hexylmagnesium chloride.

7. The process according to claim 2, wherein the polymeric support is in the form of particles having a mean particle diameter of about 5 to 1000 microns, a pore volume of at least about 0.05 cm$^3$/g, a pore diameter of about 20 to 10000 angstroms and a surface area of about 0.1 to 100 m$^2$/g.

8. The process according to claim 7, wherein said polymeric support has a pore diameter from about 500 to 10000 angstroms and a surface area from about 0.2 to 30 m$^2$/g.

9. The process according to claim 8, wherein the polymeric support is comprised of polyvinylchloride having a molecular weight in the range of about 5000 to 500000 g/mole.

10. The process according to claim 9, wherein the Grignard compound is used in the range of about 0.05 to 20 mmol per gram of polymeric support.

11. The process according to claim 1, wherein the molar ratio of vanadium to magnesium in the catalyst precursor is in the range of about 0.01 to 50.

12. The process according to claim 3, wherein the aluminum compound is trimethylaluminum, triethylaluminum, tri-isobutylaluminum or tri-n-hexylaluminum.

13. The process according to claim 2, wherein the aluminum compound is methyl aluminoxane (MAO) or modified methyl aluminoxane (MMAO).

14. The process according to claim 2, wherein the aluminum compound is a mixture of an alkylaluminum and an aluminoxane.

15. The process according to claim 2, wherein the ratio of moles of aluminum in said cocatalyst to the moles of titanium in said catalyst precursor is about 10 to 5000.

16. The process according to claim 2, wherein the titanium compound is selected from the group consisting of titanium trichloromethoxide, titanium dichlorodimethoxide, titanium tetramethoxide, titanium trichloroethoxide, titanium dichlorodiethoxide, titanium tetraethoxide, titanium trichloropropoxide, titanium dichlorodipropoxide, titanium chlorotripropoxide, titanium tetrapropoxide, titanium trichlorobutoxide, titanium dichlorodibutoxide, and titanium tetrabutoxide.

17. The process according to claim 16, wherein the magnesium compound comprises diethylmagnesium, di-n-propylmagnesium, di-isopropylmagnesium, di-n-butylmagnesium, di-isobutylmagnesium butylethylmagnesium, dihexylmagnesium, dioctylmagnesium, butyloctylmagnesium, ethylmagnesium chloride, butylmagnesium chloride, or hexylmagnesium chloride.

18. The process according to claim 16, wherein the aluminum compound is trimethylaluminum, triethylaluminum, tri-isobutylaluminum or tri-n-hexylaluminum.

19. The process according to claim 17, wherein the aluminum compound comprises methyl aluminoxane (MAO) or modified methyl aluminoxane (MMAO).

* * * * *